R. H. DUDGEON.
HYDRAULIC JACK.
No. 10,865. Reissued Sept. 13, 1887.
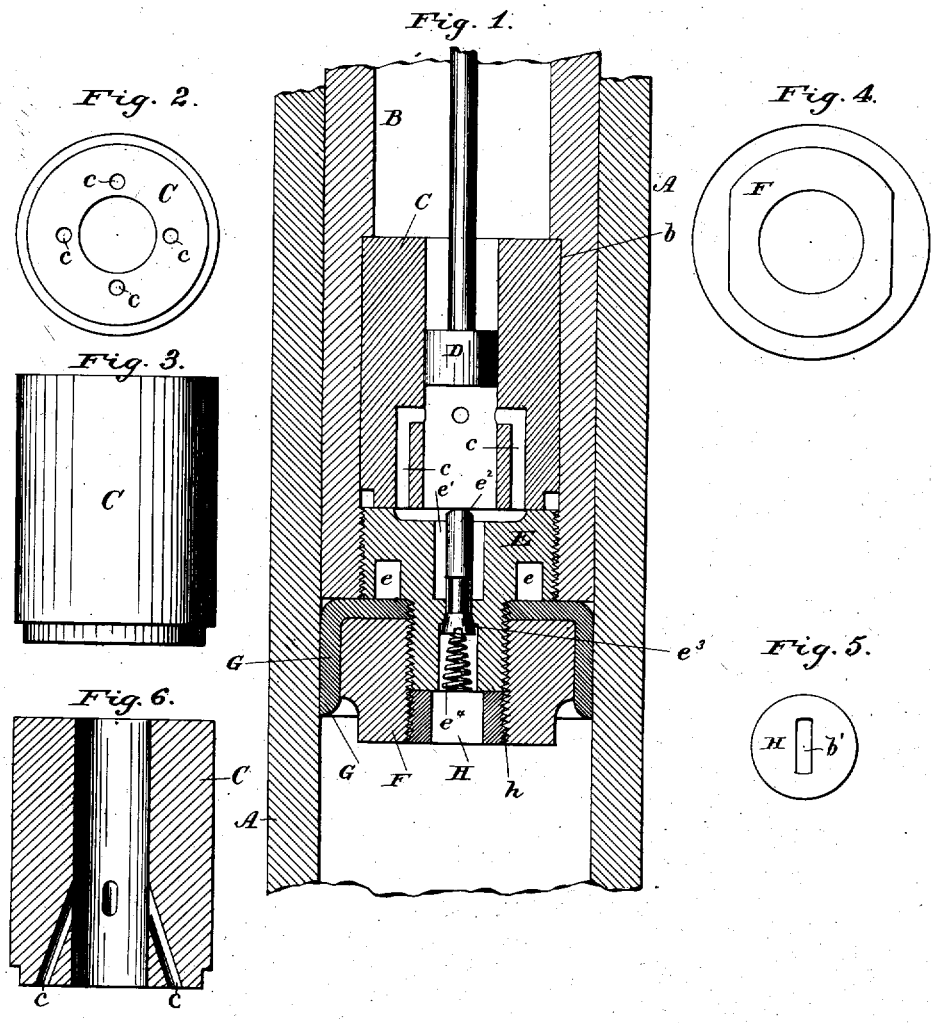
WITNESSES.
N. N. Low
E. H. Dick
INVENTOR.
Richard H. Dudgeon
by Marcellus Bailey
his ATTORNEY.

UNITED STATES PATENT OFFICE.

RICHARD H. DUDGEON, OF NEW YORK, N. Y.

HYDRAULIC JACK.

SPECIFICATION forming part of Reissued Letters Patent No. 10,865, dated September 13, 1887.

Original No. 297,975, dated May 6, 1884. Application for reissue filed January 9, 1886. Serial No. 188,109.

*To all whom it may concern:*

Be it known that I, RICHARD H. DUDGEON, a citizen of the United States, residing in the city, county, and State of New York, have invented certain new and useful Improvements in Hydraulic Jacks, of which the following is a specification.

My invention relates to improvements in hydraulic jacks; and it relates particularly to the arrangement and construction of the hollow piston and the passages therein; and the object of my invention is to construct hydraulic jacks having great durability combined with rapidity of action.

The nature of my invention will be fully explained by reference to the accompanying specification and the drawings annexed, which form part of the same.

Referring to the drawings, Figure 1 is a central vertical section of so much of a hydraulic jack as is necessary to illustrate my invention. Figs. 2, 3, 4, and 5 are detail views of the parts separately, and Fig. 6 represents a modification of the internal cylinder.

In each of the views similar letters of reference indicate corresponding parts wherever they occur.

A represents a portion of the piston-cylinder, and B the hollow piston, which is bored out at *b* to receive an independent internal cylinder, C, in which the plunger D operates. This plunger is of course provided with the valve, liquid-passages, packing, &c., usual in the pump-plungers of hydraulic jacks, and which are too well known to require illustration or description. The internal independent cylinder, C, is provided with a series of liquid-passages, *c*, bored or otherwise formed in the body thereof. The internal cylinder, C, is held in place in the hollow piston B by means of a valve block or plug, E, screwed into the hollow piston by means of a key or driver adapted to be received into the recesses *e e*, or by other suitable means. On its under side the block or plug E is formed with a circular extension, which is tapped to receive a nut or binding piece, F, for the purpose of supporting and holding the packing G properly in position. In the center of the block or plug E, I form an aperture, $e'$, in which is arranged a valve-shaft, $e^2$, formed on its lower end into a conical valve, $e^3$. The valve $e^3$ and its stem $e^2$ are held in position by means of a coiled or other suitable spring, $e^4$, which is held in position by means of a bearing plate or plug, H, which is tapped with a screw-thread, *h*, adapted to be received into a corresponding thread in the under side of the nut or binding-piece F. In the center of the plate or plug H, I form a slot or opening, $b'$, for the passage to and fro of the liquid as regulated by the valve $e^3$.

In the upper side of the valve block or plug E, I form a dish-shaped cavity, which not only serves as a means of communication to the passages *c* of the cylinder C, but also allows of the valve stem or shaft $e^2$ protruding above the surface of the block or plug E in position to be depressed by the plunger when it is desired to allow the fluid to flow back after the jack has been used, or when it is from any cause desired to lower the piston B and parts connected therewith. In the block or plug E is formed a passage or passages, by means of which the liquid is conducted to and from the upper and lower portions of the cylinder as regulated or controlled by valve $e^3$.

The operation of the device is as follows: When it is desired to operate the jack for the purpose of raising a body or superincumbent weight, the plunger D may be operated to and fro in a vertical direction by a lever and crank-arm (not shown) in the usual manner, the stroke imparted to the plunger D being regulated in extent so that the packing of the plunger D shall not pass below the point at which the upper ends of the backflow-passages *c* open into the cylinder C. At each descent of the plunger D the fluid will be forced through the passages *c* and $e'$ against the valve $e^3$, with the effect of depressing it, thereby allowing the fluid to enter the chamber beneath the piston B, and consequently to proportionately raise the latter. To lower the jack either with or without a load on it, the plunger D is forced down far enough to bear upon and depress the shaft or stem $e^2$ of the valve $e^3$, thereby opening the valve and allowing the liquid to return through the passages $b'$ $e'$ *c* to the upper cavity of the cylinder C, passing around the plunger D, which, when depressing the valve $e^3$, is below the point or points where the passages *c* enter the cylinder C. In this way the piston B and its superincumbent load are permitted to descend.

In Fig. 6 I have shown the passages *c* in the internal cylinder, C, formed at an angle, in place of in a vertical and horizontal direction, as shown in Fig. 1.

Having thus described my invention, what I claim, and desire to secure by Letters Patent, is—

1. The combination, with a hollow piston, of a removable internal plunger cylinder provided with internal fluid-passages and held in position by a valve block or plug formed with an extension adapted to hold and support a nut or binding-piece and packing in position, substantially as shown and described.

2. The combination, with the hollow piston B and independent cylinder C, provided with internal fluid-passages, *c*, of the valve block or plug E, valve $e^3$, and a packing, G, and nut or binding-piece F, substantially as shown and described.

3. A hydraulic jack having the backflow-passages *c* within the walls thereof, opening into the cylinder C at points below the upper end of the packing of the plunger in its normal pumping-stroke, whereby the backflow of the liquid is prevented until the packing of the plunger is forced below said openings, substantially as set forth.

Signed at the city of New York, county and State of New York, this 17th day of December, 1885.

RICHARD H. DUDGEON.

Witnesses:
JOHN H. IVES,
CHARLES B. WEBERG.